US012424195B2

(12) United States Patent
Kim

(10) Patent No.: US 12,424,195 B2
(45) Date of Patent: Sep. 23, 2025

(54) VEHICLE AND METHOD OF CONTROLLING THE SAME

(71) Applicants: Hyundai Motor Company, Seoul (KR); Kia Corporation, Seoul (KR)

(72) Inventor: Jeakwan Kim, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 317 days.

(21) Appl. No.: 18/107,564

(22) Filed: Feb. 9, 2023

(65) Prior Publication Data

US 2023/0282194 A1 Sep. 7, 2023

(30) Foreign Application Priority Data

Mar. 2, 2022 (KR) ........................ 10-2022-0026990

(51) Int. Cl.
*G10K 11/178* (2006.01)

(52) U.S. Cl.
CPC .. *G10K 11/17817* (2018.01); *G10K 11/17823* (2018.01); *G10K 11/17825* (2018.01); *G10K 11/17881* (2018.01); *G10K 11/17883* (2018.01); *G10K 2210/12821* (2013.01); *G10K 2210/3011* (2013.01); *G10K 2210/3022* (2013.01); *G10K 2210/3026* (2013.01); *G10K 2210/3027* (2013.01); *G10K 2210/3028* (2013.01); *G10K 2210/3031* (2013.01); *G10K 2210/3035* (2013.01); *G10K 2210/3044* (2013.01); *G10K 2210/3055* (2013.01)

(58) Field of Classification Search
CPC ....... G10K 11/17817; G10K 11/17825; G10K 11/17879; G10K 11/17883
See application file for complete search history.

(56) References Cited

U.S. PATENT DOCUMENTS

| | | | | |
|---|---|---|---|---|
| 10,741,162 | B1 | 8/2020 | Bastyr | |
| 2023/0306947 | A1 * | 9/2023 | Bastyr | G10K 11/17879 |

FOREIGN PATENT DOCUMENTS

| | | | | |
|---|---|---|---|---|
| KR | 20190063850 A | | 6/2019 | |
| KR | 20210003671 A | | 1/2021 | |
| WO | WO-2004009007 A1 | * | 1/2004 | G10K 11/178 |

* cited by examiner

*Primary Examiner* — Kile O Blair
(74) *Attorney, Agent, or Firm* — Fox Rothschild LLP

(57) ABSTRACT

A noise cancelling system for a vehicle includes a microphone, at least one first sensor configured to collect first data related to an element that generates a noise sound, at least one second sensor configured to collect second data related to an element that changes a secondary path of the noise sound, a controller configured to select a secondary path model corresponding to the second data from among a plurality of pre-stored secondary path models, input the first data to a secondary path filter corresponding to the selected secondary path model, and generate an anti-noise signal based on output data of the secondary path filter and error data received from the microphone, and a speaker configured to output an anti-noise sound based on the anti-noise signal.

19 Claims, 5 Drawing Sheets

FIG. 5

| TEMPERATURE / ARRANGEMENT \ HUMIDITY | | 0% | 10% | 20% | · · · |
|---|---|---|---|---|---|
| -10℃ | RR, RL, F | $M_{111}$ | $M_{121}$ | $M_{131}$ | · · · |
| | RR, RL | $M_{112}$ | $M_{122}$ | $M_{132}$ | · · · |
| | RR, F | $M_{113}$ | $M_{123}$ | $M_{133}$ | · · · |
| | RL, F | $M_{114}$ | $M_{124}$ | $M_{134}$ | · · · |
| | RR | $M_{115}$ | $M_{125}$ | $M_{135}$ | · · · |
| | RL | $M_{116}$ | $M_{126}$ | $M_{136}$ | · · · |
| | F | $M_{117}$ | $M_{127}$ | $M_{137}$ | · · · |
| -5℃ | RR, RL, F | $M_{211}$ | $M_{221}$ | $M_{231}$ | · · · |
| | RR, RL | $M_{212}$ | $M_{222}$ | $M_{232}$ | · · · |
| | RR, F | $M_{213}$ | $M_{223}$ | $M_{233}$ | · · · |
| | RL, F | $M_{214}$ | $M_{224}$ | $M_{234}$ | · · · |
| | RR | $M_{215}$ | $M_{225}$ | $M_{235}$ | · · · |
| | RL | $M_{216}$ | $M_{226}$ | $M_{236}$ | · · · |
| | F | $M_{217}$ | $M_{227}$ | $M_{237}$ | · · · |
| 0℃ | ⋮ | ⋮ | ⋮ | ⋮ | ⋮ |
| 5℃ | ⋮ | ⋮ | ⋮ | ⋮ | ⋮ |
| ⋮ | ⋮ | ⋮ | ⋮ | ⋮ | ⋮ |

VEHICLE AND METHOD OF CONTROLLING THE SAME

CROSS-REFERENCE TO RELATED APPLICATION(S)

This application claims, under 35 U.S.C. § 119 (a), the benefit of Korean Patent Application No. 10-2022-0026990, filed on Mar. 2, 2022, which application is hereby incorporated herein by reference.

BACKGROUND

1. Technical Field

The present disclosure relates to a vehicle and a method of controlling the vehicle equipped with a noise canceling function, and more particularly, to a vehicle for changing a secondary path model based on data obtained through a vehicle sensor, and a method for controlling the same.

2. Background

Generally, noise canceling (NC) is a technology that blocks unwanted sound by generating destructive interference that cancels out noise sounds after collecting ambient noise sounds through a microphone, and is a type of Active Noise Control (ANC).

Recently, a NC system is installed on a vehicle to block external and internal noise transmitted to occupants, thereby providing a more comfortable environment for occupants.

For example, a NC system installed on a vehicle may include a road noise canceling system and an engine noise canceling system.

In a road noise canceling system, a vibration sensor is used to detect vibration generated by friction between a surface of a road and a tire of a vehicle. More specifically, the road noise canceling system outputs anti-noise sound for reducing noise generated from the surface of the road by processing vibration data obtained through the vibration sensor.

In an engine noise canceling system, revolutions per minute (RPM) sensor of an engine is used to detect an operating state of the engine. More specifically, the engine noise canceling system outputs an anti-noise sound for reducing noise generated from the engine by processing RPM data obtained through the RPM sensor.

Each of the road noise canceling system and the engine noise canceling system generates anti-noise sound based on data obtained through a vibration sensor or an engine RPM sensor, so considering a secondary path between a speaker and a microphone is required.

SUMMARY

An embodiment of the present disclosure provides a vehicle configured for efficiently selecting a secondary path model corresponding to various conditions, and a method of controlling the same.

Additional embodiments of the disclosure will be set forth in part in the description which follows and, in part, will be obvious from the description, or may be learned by practice of the disclosure.

In accordance with an embodiment of the disclosure, a noise cancelling system for a vehicle includes a microphone, at least one first sensor configured to collect first data associated with at least one element that generates a noise sound, at least one second sensor configured to collect second data associated with at least one element that changes a secondary path of the noise sound, a controller configured to select a secondary path model corresponding to the second data from among a plurality of pre-stored secondary path models, input the first data to a secondary path filter corresponding to the selected secondary path model, and generate an anti-noise signal based on output data of the secondary path filter and error data received from the microphone, and a speaker configured to output an anti-noise sound based on the anti-noise signal.

The at least one first sensor may include at least one of: a vibration sensor and/or an engine revolutions per minute (RPM) sensor, and the at least one second sensor may include at least one of: a temperature sensor, a humidity sensor, and/or a seat sensor.

The controller may select the secondary path model corresponding to the second data based on at least one of temperature, humidity, number of occupants, and/or position of each occupant.

The plurality of secondary path models may be predefined in advance based on at least one of temperature, humidity, number of occupants, and/or position of each occupant.

The controller may generate the anti-noise signal by inputting the first data into an anti-noise signal generation filter.

The controller may correct a transfer function of the anti-noise signal generation filter based on the output data of the secondary path filter and the error data received from the microphone.

The controller may store a lookup table in which the second data and the plurality of secondary path models are matched.

The noise cancelling system for a vehicle may further include a communicator configured to receive update data for updating the lookup table from a server.

The noise cancelling system for a vehicle may further include a user interface configured to receive a user input for stopping or activating the output of the anti-noise sound.

In accordance with another embodiment of the disclosure, a method of controlling a noise cancelling system of a vehicle is provided. The method includes receiving, by a controller, first data associated with at least one element that generates a noise sound, receiving, by the controller, second data associated with at least one element that changes a secondary path of the noise sound, selecting, by the controller, a secondary path model corresponding to the second data from among a plurality of pre-stored secondary path models, inputting, by the controller, the first data to a secondary path filter corresponding to the selected secondary path model, generating, by the controller, an anti-noise signal based on output data of the secondary path filter and error data received from the microphone, and outputting, by the controller, an anti-noise sound based on the anti-noise signal.

The first data may be obtained by at least one of a vibration sensor and/or an engine revolutions per minute (RPM) sensor, and the second data may be obtained by at least one of a temperature sensor, a humidity sensor, and/or a seat sensor.

The selecting of the secondary path model may further include selecting, by the controller, the secondary path model corresponding to the second data based on at least one of temperature, humidity, number of occupants, and/or position of each occupant.

The plurality of secondary path models may be predefined in advance based on at least one of temperature, humidity, number of occupants, and/or position of each occupant.

The generating of the anti-noise signal may further include generating, by the controller, the anti-noise signal by inputting the first data to an anti-noise signal generation filter.

The generating of the anti-noise signal may further include correcting, by the controller, a transfer function of the anti-noise signal generation filter based on the output data of the secondary path filter and the error data collected from the microphone.

The pre-stored plurality of secondary path models may be included in a lookup table in which the second data and the plurality of secondary path models are matched.

The method may further include receiving, by the controller, update data for updating the lookup table from a server.

The method may further include receiving, by the controller, a user input for stopping or activating the output of the anti-noise sound.

BRIEF DESCRIPTION OF THE DRAWINGS

These and/or other aspects of embodiments of the disclosure will become apparent and more readily appreciated from the following description of the embodiments, taken in conjunction with the accompanying drawings, in which:

FIG. 5 is a view illustrating an example of a lookup table according to an exemplary embodiment of the present disclosure.

DETAILED DESCRIPTION

Figure 1:
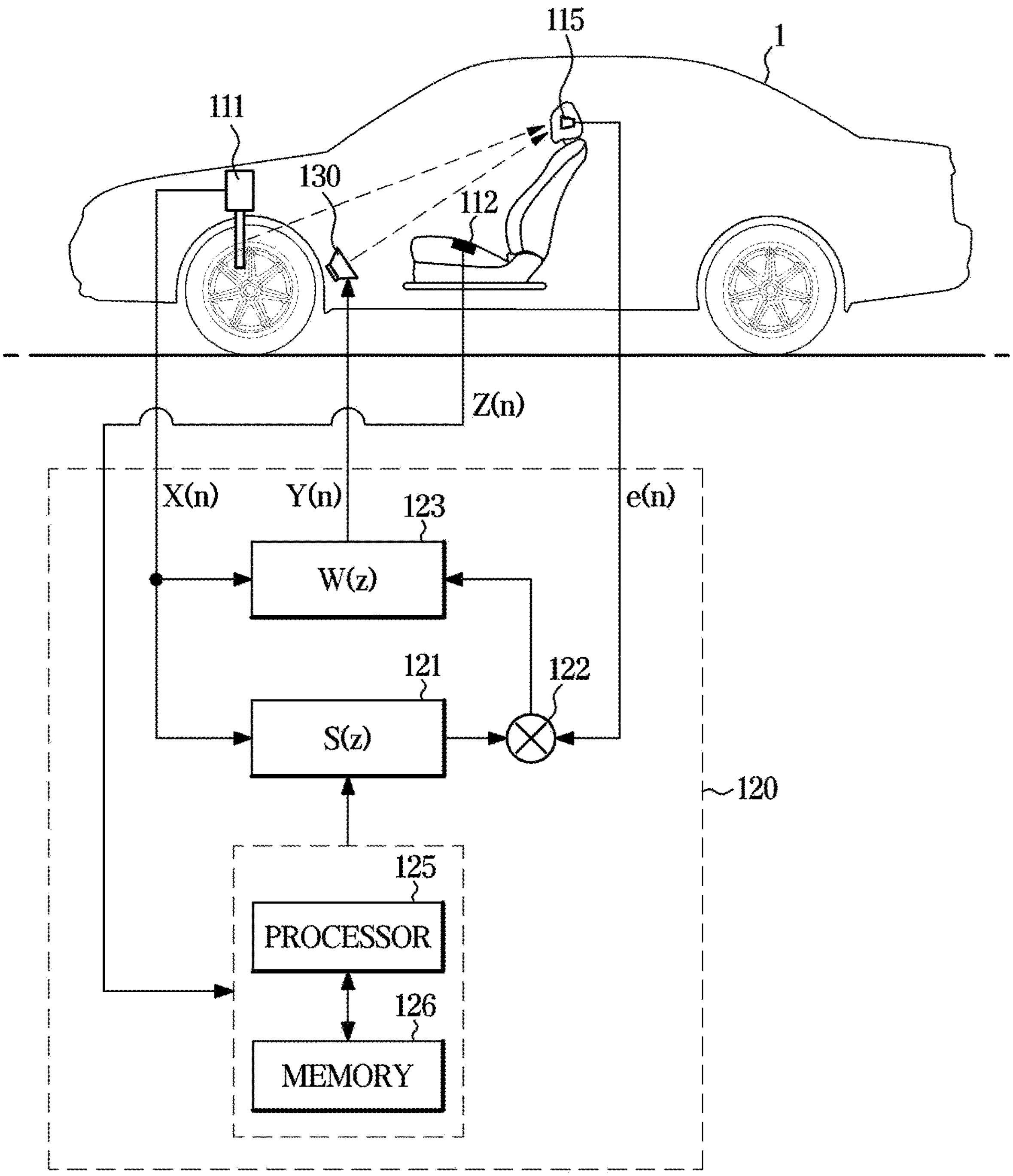
FIG. 1 is a schematic view illustrating a configuration of a vehicle according to an exemplary embodiment of the present disclosure.

Reference will now be made in detail to the embodiments of the disclosure, examples of which are illustrated in the accompanying drawings, wherein like reference numerals refer to like elements throughout. This specification does not describe all elements of the disclosed embodiments and detailed descriptions of what is well known in the art or redundant descriptions on substantially the same configurations have been omitted. The terms 'part', 'module', 'member', 'block' and the like as used in the specification may be implemented in software or hardware. Further, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the disclosure will be described in detail with reference to the accompanying drawings.

Figure 2:
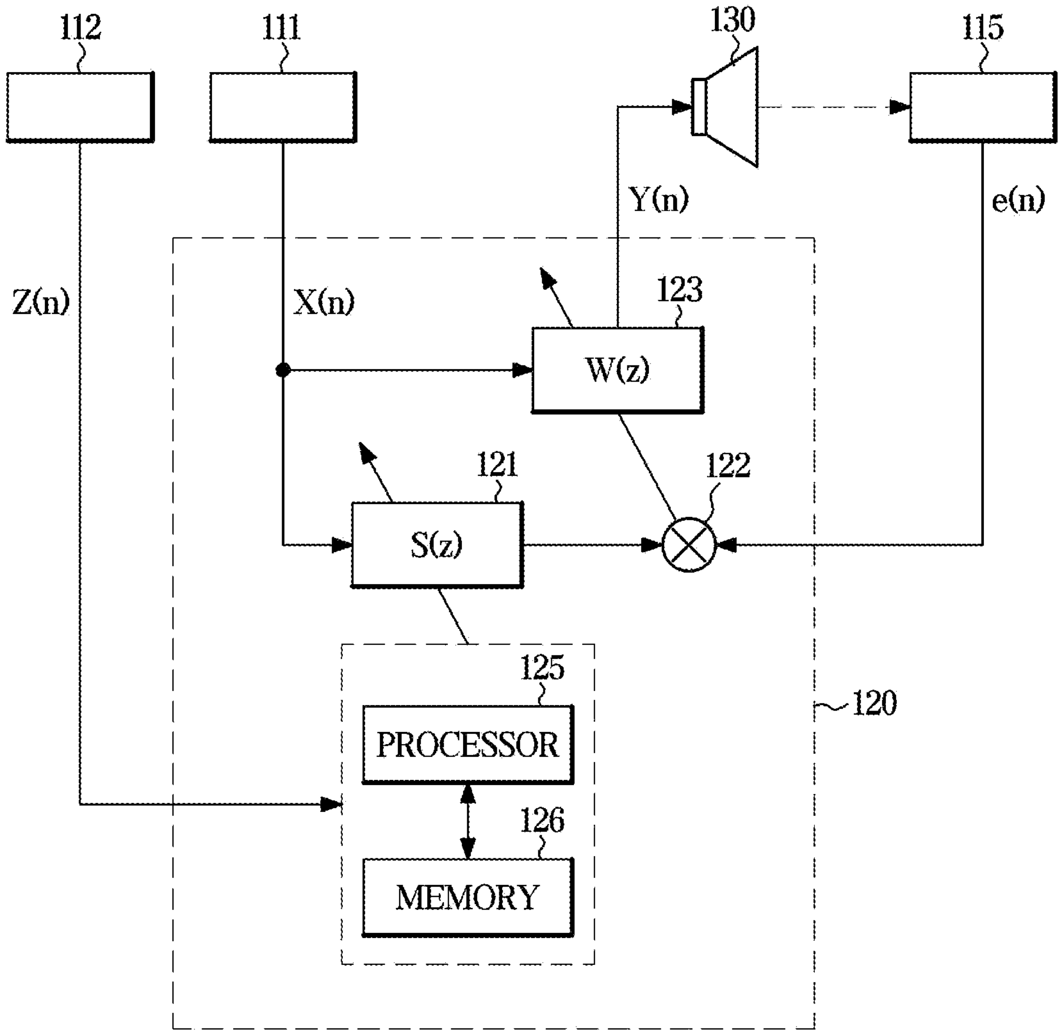
FIG. 2 is an enlarged view illustrating a configuration of a controller according to an exemplary embodiment of the present disclosure.
Figure 3:
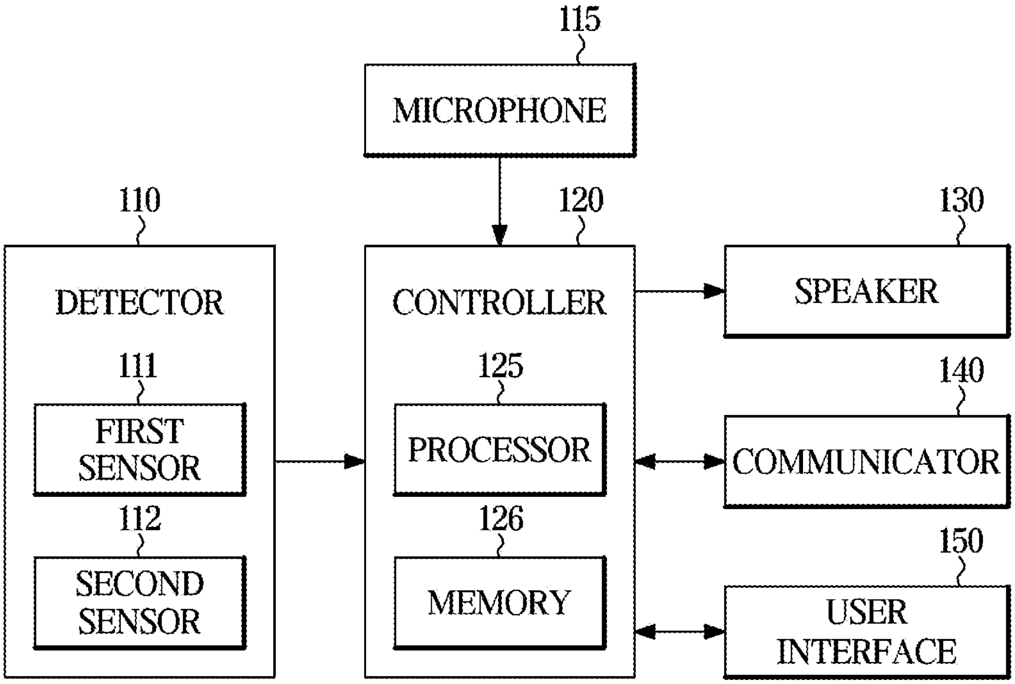
FIG. 3 is a block view illustrating a configuration of a vehicle according to according to an exemplary embodiment of the present disclosure.

FIG. 1 is a schematic view illustrating a configuration of a vehicle according to an exemplary embodiment of the present disclosure, FIG. 2 is an enlarged view illustrating a configuration of a controller according to an exemplary embodiment of the present disclosure, and FIG. 3 is a block view illustrating a configuration of a vehicle according to according to an exemplary embodiment of the present disclosure.

Referring to FIGS. 1 to 3, a vehicle 1 according to an exemplary embodiment may include a detector 110, a microphone 115, a controller 120, a speaker 130, a communicator 140, and/or a user interface 150.

The detector 110 may include at least one first sensor 111 that collects data associated with at least one element that generates noise sound (hereinafter referred to as first data), and at least one second sensor 112 that collects data associated with at least one element that changes a secondary path of the noise sound (hereinafter referred to as second data).

The first sensor 111 may include at least one first sensor that collects first data X(n).

The element that generates the noise sound may include friction between the tires of the vehicle 1 and the road surface and/or an operation of an engine of the vehicle 1.

Accordingly, the first sensor 111 may include a vibration sensor for detecting vibration generated by friction between the tires of the vehicle 1 and the road surface and/or an engine RPM sensor for detecting the operating state of the engine.

The first sensor 111 may transmit the first data X(n) to the controller 120. In this case, the first data X(n) may include analog data and/or digital data.

When the first data X(n) corresponds to analog data, the controller 120 may process digital data after converting analog data into digital data through an analog-to-digital (ADC) filter.

In various embodiments, the first data X(n) is data based on generating an anti-noise sound, and may be defined as a reference signal or a noise signal.

The vibration sensor may be provided in various positions capable of sensing vibration transmitted to the vehicle 1, as well as a suspension and sub frame of the vehicle 1.

The vibration sensor may include an acceleration sensor that measures acceleration in three axes (X-axis, Y-axis, and Z-axis). For example, the vibration sensor may be provided as an acceleration sensor such as, a piezoelectric type, a strain gauge type, a piezoresistive type, a capacitive type, a servo type, or an optical type, or the like. Furthermore, the vibration sensor may be provided as various sensors (e.g., gyroscope) that measures vibration transmitted to the vehicle 1.

The vibration sensor may detect vibration transmitted to the vehicle 1 to transmit the first data X(n) (vibration data) to the controller 120.

The controller 120 may generate an anti-noise signal Y(n) based on processing the vibration data, and the speaker 130 may generate an anti-noise sound based on the anti-noise signal Y(n).

In this case, the controller 120 may refer to an electronic control unit for controlling a road noise canceling system.

The engine RPM sensor may include at least one sensor for detecting a rotation speed of the engine. For example, the engine RPM sensor may include a hall sensor for detecting a rotation speed of a rotating element (e.g., an engine drive shaft) corresponding to the rotation speed of the engine.

However, as long as if s a sensor is a sensor for detecting the rotational speed of the rotating element, it may be employed as an engine RPM sensor without any limitation. For example, the engine RPM sensor may include an optical sensor and/or an inductive sensor.

The engine RPM sensor may detect the RPM of the engine and transmit the first data X(n) (RPM data) to the controller 120.

The controller 120 may generate an anti-noise signal Y(n) based on the processing of the RPM data, and the speaker 130 may generate an anti-noise sound based on the anti-noise signal Y(n).

In this case, the controller 120 may refer to an electronic control unit for controlling an engine noise canceling system.

The second sensor 112 may include at least one second sensor that collects second data Z(n).

The second sensor 112 may transmit the second data Z(n) to the controller 120. In this case, the second data Z(n) may include analog data and/or digital data.

When the second data Z(n) corresponds to analog data, the controller 120 may process digital data after converting analog data into digital data through the ADC filter.

The second data Z(n) may include various data not related to the generation of noise.

For example, the second data Z(n) may include temperature data inside or around the vehicle 1, humidity data inside or around the vehicle 1, data regarding the number of occupants, data regarding a location of the occupants, and/or data regarding a load (e.g., a car seat) loaded inside the vehicle 1.

However, the examples of the second data Z(n) is not limited to the above types, and the second data Z(n) may include data related to an element that changes the secondary path of the noise sound without any limitation.

Accordingly, the second sensor 112 may include a temperature sensor, a humidity sensor, and/or a seat sensor, as well as various types of sensors for acquiring data related to elements that change the secondary path model.

The temperature sensor may include at least one sensor for detecting a temperature around the vehicle 1 and/or a temperature inside the vehicle 1.

The temperature sensor may detect the temperature around the vehicle 1 and/or the temperature inside the vehicle 1 to transmit the detected temperature data to the controller 120.

The humidity sensor may include at least one sensor for detecting humidity around the vehicle 1 and/or humidity inside the vehicle 1.

The humidity sensor may detect the humidity around the vehicle 1 and/or the humidity inside the vehicle 1 to transmit the detected humidity data to the controller 120.

The seat sensor may include at least one sensor for detecting an occupant inside the vehicle 1.

For example, the seat sensor may include a weight sensor provided on a seat inside the vehicle 1. However, a type of the seat sensor is not limited to the weight sensor, and any sensor capable of detecting the number of occupants in the vehicle 1 and the positions of the occupants may be employed as the seat sensor without any limitation.

For example, the seat sensor may include a camera for photographing the inside of the vehicle 1 and/or a radar/ultrasound sensor for scanning the inside of the vehicle 1.

When the seat sensor is provided as a radar sensor and/or an ultrasonic sensor, the seat sensor may collect data on a load loaded in the vehicle 1.

The seat sensor may transmit data on the number of occupants, data on the positions of occupants, and/or data on the load (e.g., a car seat) loaded in the vehicle 1 to the controller 120.

As will be described later, the controller 120 may select the secondary path model based on the second data Z(n), and accordingly, may employ an optimal secondary path model without boosting noise.

The microphone 115 may collect the sound transmitted to the occupants and output the sound as an electrical signal.

The microphone 115 used in the road surface noise canceling system and/or the engine noise canceling system may generate an error signal between the noise sound and the anti-noise sound by collecting a sound in which the noise sound generated from a noise source (e.g., road surface and/or an engine) and the anti-noise sound output from the speaker 130 are combined.

Accordingly, the microphone 115 may be defined as an error microphone.

Hereinafter, for convenience of description, data collected through the microphone 115 is defined as an error data e(n).

The error data e(n) may refer to an error signal between the noise sound generated from the noise source and an anti-noise sound.

Typically, a path between the noise source and the microphone 115 is defined as a primary path, and a path between the speaker 130 and the microphone 115 is defined as a secondary path.

To minimize a difference between the primary path and the secondary path, the microphone 115 may be provided between the noise source and the speaker 130, but the position of the microphone 115 is not limited thereto.

The microphone 115 may transmit the error data e(n) to the controller 120.

In various embodiments, the vibration sensor included in the first sensor 111 may be provided as plural, and the vehicle 1 may include a plurality of speakers 130 to output the anti-noise sound corresponding to the vibration data collected from each vibration sensor. In addition, the vehicle 1 may include a plurality of microphones 115 to collect the error data e(n) corresponding to the anti-noise sound output from each of the plurality of speakers 130.

The controller 120 may generate the anti-noise signal Y(n) based on the first data X(n) received from the first sensor 111, the second data Z(n) received from the second sensor 112, and the error data e(n) received from the microphone 115.

The speaker 130 may output the anti-noise sound based on the anti-noise signal Y(n) output from the controller 120.

In various embodiments, the controller 120 may include at least one memory 126 in which a program for performing the above-described operations and an operation to be described later is stored, and at least one processor 125 for executing the stored program. When the controller 120 includes a plurality of memories 126 and a plurality of processors 125, the plurality of memories 126 and the plurality of processors 125 may be directly on one chip or physically separated.

For example, the controller 120 may include at least one processor mounted on a head unit of the vehicle 1, an audio, video, navigation and telematics (AVNT) terminal unit, and the like, but it is not limited thereto, and the controller 120 may include a separate processor provided inside the vehicle 1.

Furthermore, the at least one memory 126 may store a plurality of secondary path models.

A plurality of secondary path models pre-stored in the memory 126 may be predetermined according to driving environments of the vehicle 1 in development stages of the vehicle 1.

More specifically, the memory 126 may store a lookup table in which the second data Z(n) and the plurality of secondary path models are matched.

In other words, the memory 126 may store a lookup table for the plurality of secondary path models corresponding to the driving environments of various vehicles 1.

For example, developers may measure a state of the secondary path for each driving environment of the vehicle 1, and thus may derive the secondary path model corresponding to the driving environment of the vehicle 1.

Furthermore, a plurality of secondary path filters corresponding to the plurality of secondary path models may be derived.

A transfer function of a secondary path filter 121 may refer to a transfer function between input data and output data of the secondary path filter 121.

All filters to be described below may also refer to transfer functions between input data and output data, respectively.

The plurality of secondary path models will be described later in detail.

The output data of the secondary path filter 121 and the error data e(n) obtained from the microphone 115 may be input to a least mean square (LMS) adaptive filter 122 operating according to LMS algorithms.

The LMS adaptive filter 122 may be programmed to correct a transfer function W(z) of an anti-noise signal generation filter 123 based on the output data of the secondary path filter 121 and the error data e(n) obtained from the microphone 115.

The coefficients of the LMS adaptive filter 122 may be corrected based on the output data of the secondary path filter 121 and the error data e(n).

The LMS adaptive filter 122 may correct the transfer function W(z) of the anti-noise signal generation filter 123 based on the output data of the secondary path filter 121, which is a result of the first data X(n) being filtered by the secondary path filter 121, and the error data e(n).

In other words, the coefficient for each order of the transfer function W(z) of the anti-noise signal generation filter 123 may be controlled by the LMS adaptive filter 122.

The anti-noise signal generation filter 123 may output the anti-noise signal Y(n) by using the first data X(n) as input data.

The speaker 130 may output the anti-noise sound based on the anti-noise signal Y(n).

The transfer function W(z) of the anti-noise signal generation filter 123 is controlled by the LMS adaptive filter 122, and the coefficients of the LMS adaptive filter 122 is determined by the output data of the secondary path filter 121 and the error data e(n). Accordingly, as a result, the transfer function W(z) of the anti-noise signal generation filter 123 may be changed according to the secondary path filter 121.

If a secondary path model different from the actual secondary path is selected, the transfer function W(z) of the anti-noise signal generation filter 123 may diverge, resulting in noise boosting, thereby causing inconvenience of occupants.

According to the present disclosure, because the secondary path model corresponding to the driving environment of the vehicle 1 is pre-stored in the memory 126, the optimal secondary path may be selected directly based on the second data Z(n) collected through the second sensor 112 regardless of the first data X(n). Accordingly, it is possible to respond to a change in the secondary path without noise boosting.

The communicator 140 may include a wireless communication module (e.g., a cellular communication module, a short-range wireless communication module, or a global navigation satellite system (GNSS) communication module), or a wired communication module (e.g., a local area network (LAN) communication module, or power line communication module). The communicator 140 may communicate with an external server via a first network (e.g., a short-range communication network such as, Bluetooth, wireless fidelity (WiFi) direct, or infrared data association (IrDA)), or a second network (e.g., a long-range communication network such as, a legacy cellular networks, 5G networks (e.g. OTA), next-generation telecommunications networks, Internet, or computer networks (e.g., LAN or WAN)).

The communicator 140 may receive update data for updating the lookup table stored in the memory 126 from an external server.

The developers may develop the plurality of secondary path models corresponding to various driving environments for customer service not only in the development stages of the vehicle 1 but also after the vehicle 1 is sold.

Accordingly, sellers of the vehicle 1 may keep the lookup table stored in the memory 126 up to date by transmitting the update data for updating the lookup table to the communicator 140 through the server.

The user interface 150 may include a display for displaying various information related to the noise canceling function and an inputter for receiving various user inputs related to the noise canceling function.

The display may be a Light Emitting Diode (LED) panel, an Organic Light Emitting Diode (OLED) panel, a Liquid Crystal Display (LCD) panel, and/or an indicator. Furthermore, the display may include a touch screen.

For example, the display may include a navigation device, a heads-up display and/or a cluster.

The display may provide various user interfaces for users to set the noise canceling function.

The inputter may include buttons, dials, and/or touchpads provided at various locations in the vehicle 1.

For example, the inputter may include a push button, a touch button, a touch pad, a touch screen, a dial, a stick-type operation device and/or a track ball. When the inputter is implemented as a touch screen, the inputter may be provided integrally with the display.

In an embodiment, the user interface 150 may provide a user interface for activating or deactivating the road noise canceling system and/or the engine noise canceling system.

Furthermore, the user interface 150 may receive a user input for activating or deactivating the road surface noise canceling system and/or the engine noise canceling system from the occupant.

In other words, the user interface 150 may receive a user input for stopping or activating the output of the anti-noise sound.

The controller 120 may stop the output of the anti-noise sound based on receiving a user input for stopping the output of the anti-noise sound.

Furthermore, the controller 120 may perform an operation for outputting the anti-noise sound based on receiving a user input for activating the output of the anti-noise sound.

According to an exemplary embodiment, the detector 110, the microphone 115, the controller 120, the speaker 130, the communicator 140, and the user interface 150 may transmit respective information by performing a controller area network (CAN) communication with each other, and may transmit respective information by performing wired communications. For example, for control of various electrical loads mounted on the vehicle 1 and communication between various electrical loads, a communication network including a body network, a multimedia network, and a chassis network is configured in the vehicle 1, and each of these networks separated from each other may be connected by the controller 120 to send and receive the CAN communication message between each other.

As described above, the configurations of the vehicle 1 and the operation and structure of each configuration according to the exemplary embodiment have been described. Hereinafter, a method of controlling the vehicle 1 using various configurations of the vehicle 1 will be described in detail.

Figure 4:
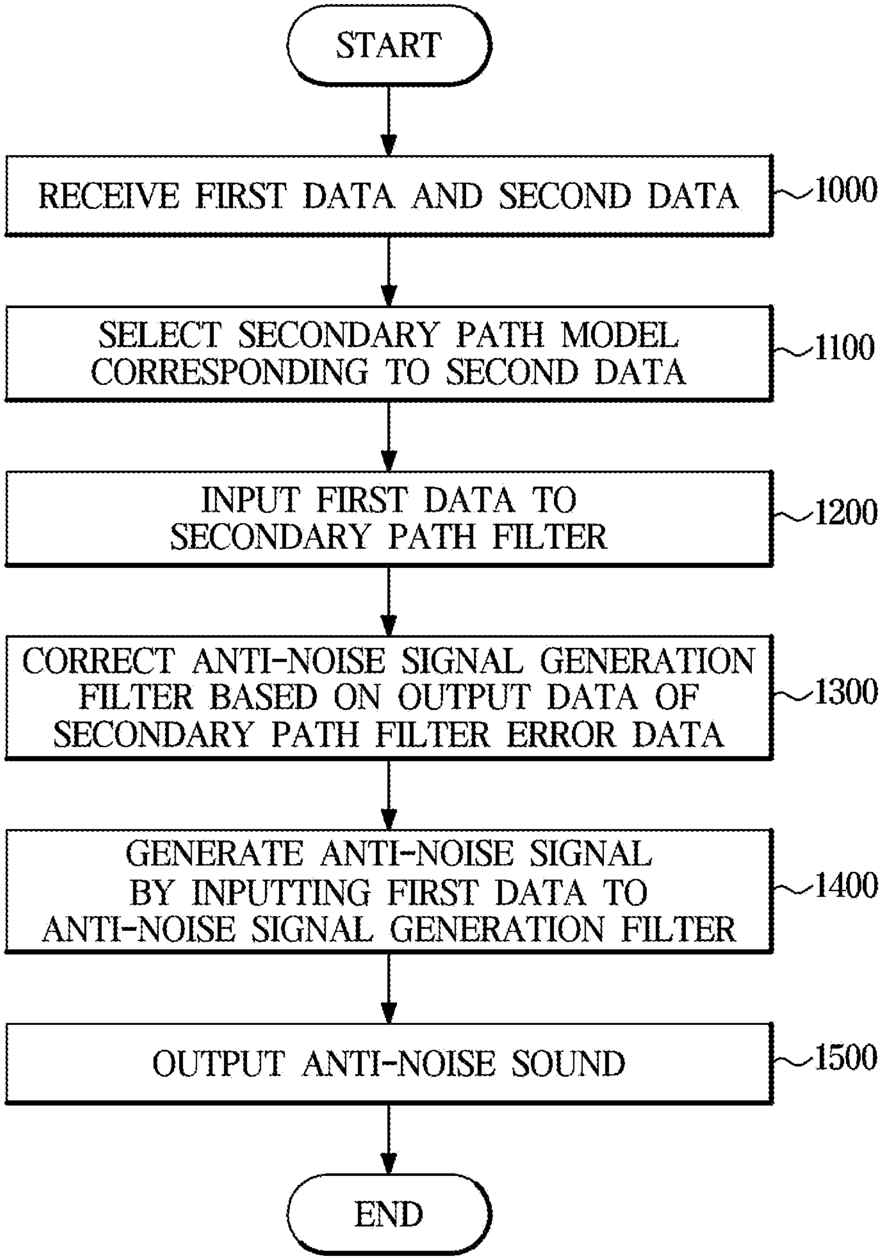
FIG. 4 is a flowchart illustrating a method of controlling a vehicle according to an exemplary embodiment of the present disclosure.

FIG. 4 is a flowchart illustrating a method of controlling a vehicle according to an exemplary embodiment of the present disclosure.

Referring to FIG. 4, the controller 120 may receive the first data X(n) from the first sensor 111 and receive the second data Z(n) from the second sensor 112 (1000).

The controller 120 may select the secondary path model based on the second data Z(n) (1100).

The lookup table in which the second data Z(n) and the plurality of secondary path models are matched is stored in the memory 126, so the controller 120 may select the secondary path model corresponding to the second data Z(n) based on the processing of the second data Z(n).

The process 1100 in which the controller 120 selects the secondary path model based on the second data Z(n) may be performed in advance before operating conditions of the noise canceling system is satisfied.

For example, the controller 120 may perform operation 1100 based on the start of the vehicle 1.

Furthermore, the controller 120 may perform operation 1100 even if a data value of the first data X(n) is smaller than a predetermined value.

For example, the controller 120 may select the secondary path model corresponding to the second data Z(n) even if the vibration value measured by the vibration sensor is smaller than a predetermined value.

As another example, the controller 120 may select the secondary path model corresponding to the second data Z(n) even if the RPM measured from the engine RPM sensor is smaller than a predetermined RPM.

In other words, the controller 120 selects the secondary path model corresponding to the current driving environment of the vehicle 1 regardless of whether noise is generated, so that when noise is generated later, the optimal secondary path model may be applied immediately.

FIG. 5 is a view illustrating an example of a lookup table according to an exemplary embodiment of the present disclosure.

Referring to FIG. 5, in the lookup table stored in the memory 126, the driving environments (e.g., humidity, temperature, number of occupants and/or arrangement of occupants) of the vehicle 1 and the plurality of secondary path models $M_{111}$ to $M_{117}$, $M_{121}$ to $M_{127}$, $M_{131}$ to $M_{137}$, $M_{211}$ to $M_{217}$, $M_{221}$ to $M_{227}$, and $M_{231}$ to $M_{237}$, and the like may be matched.

The plurality of secondary path models stored in the memory 126 may be defined in advance based on the driving environments (at least one of temperature, humidity, number of occupants, or positions of occupants) of the vehicle 1.

However, the lookup table shown in FIG. 5 is merely an example of the present disclosure, and it should be understood that the driving environments of the vehicle 1 may further include more various conditions (e.g., the sum of the weight of occupants, the presence of a car seat, etc.).

The number and arrangement of occupants is represented by RR, RL and F.

A driver is included as a default, RR refers to that the occupant is positioned at a rear right seat, RL refers to that the occupant is positioned at a rear left seat, and F refers to that the occupant is positioned at a front passenger seat.

For example, in a situation where the humidity is 0% and the temperature is −5 degrees, if the occupants are composed of a driver, the occupant seated in the front passenger seat, and the occupant seated in the rear right seat, the controller 120 may select $M_{213}$ from among the plurality of secondary path models.

More specifically, the controller 120 may select the transfer function S (z) of the secondary path filter 121 corresponding to the secondary path model $M_{213}$ selected from among the plurality of secondary path models $M_{111}$ to $M_{117}$, $M_{121}$ to $M_{127}$, $M_{131}$ to $M_{137}$, $M_{211}$ to $M_{217}$, $M_{221}$ to $M_{227}$, and $M_{231}$ to $M_{237}$, and the like.

To this end, data on the secondary path filter 121 corresponding to the plurality of secondary path models may be stored in the memory 126.

In FIG. 5, the humidity is classified by 10% unit and the temperature by 5 degrees, but the classification criterion is not limited thereto, and the temperature unit and humidity unit may be changed in more detail according to data derivation of the developers.

According to the present disclosure, the plurality of secondary path models corresponding to the driving environments of the vehicle 1 are pre-stored in the memory 126, so that the controller 120 may select the secondary path model corresponding to the driving environment of the vehicle 1 regardless of whether noise is generated.

Accordingly, the optimal secondary path model may already be selected before error (e.g., noise boosting) that may be caused by selecting an incorrect secondary path model occurs.

The controller 120 may input the first data X(n) to the secondary path filter 121 (1200). Accordingly, the first data X(n) may be output after being filtered according to the transfer function S (z) of the secondary path filter 121. The filtered first data X(n) may be input to the LMS adaptive filter 122.

In this case, the secondary path filter 121 is the secondary path filter 121 changed to suit the driving environment of the current vehicle 1 through operation 1100.

In an exemplary embodiment, the controller 120 may process the first data X(n) and input it to the secondary path filter 121. For example, the controller 120 may perform the digital conversion on the first data X(n), and then input the processed first data X(n) to the secondary path filter 121.

When the first data X(n) corresponds to the vibration data, the controller 120 may input the vibration data to the secondary path filter 121. Accordingly, the vibration data may be filtered by the transfer function S (z) of the secondary path filter 121, and the filtered vibration data may be input to the LMS adaptive filter 122.

When the first data X(n) corresponds to the engine RPM data, the controller 120 may determine an engine order of the engine RPM based on the engine RPM data.

To this end, the memory 126 may further store the lookup table for determining the engine order according to the engine RPM.

The controller 120 may input a frequency of the engine order to a frequency generator in order to generate a signal corresponding to the engine order, and filter the signal output from the frequency generator and input it to the secondary path filter 121.

In other words, operation 1200 in which the controller 120 inputs the first data X(n) to the secondary path filter 121 may include a process of appropriately processing the first data X(n) and then inputting the first data X(n) into the secondary path filter 121.

The controller 120 may correct the transfer function W(z) of the anti-noise signal generation filter 123 based on the output data of the secondary path filter 121 and the error data e(n) received from the microphone 115 (1300).

More specifically, the output data of the secondary path filter 121 and the error data e(n) received from the microphone 115 may be input to the LMS adaptive filter 122, and accordingly, the coefficient of the LMS adaptive filter 122 may be changed.

As the coefficient of the LMS adaptive filter 122 is changed, the transfer function W(z) of the anti-noise signal generation filter 123 may also be changed.

The controller 120 may generate the anti-noise signal Y(n) by inputting the first data X(n) to the anti-noise signal generation filter 123 (1400).

At this time, because the transfer function W(z) of the anti-noise signal generation filter 123 has been corrected to suit the driving environment of the vehicle 1, an error caused by the difference between the actual secondary path and the estimated secondary path may not occur.

The speaker 130 may output the anti-noise sound based on the anti-noise signal Y(n) (1500).

As the anti-noise sound is output through the speaker 130, the occupants may finally feel that the road noise or engine noise has been removed.

In various embodiments, the lookup table may be replaced with a trained artificial neural network. The artificial neural network may be learned by using the first data X(n), the second data Z(n), and the error data e(n) as training data.

The artificial neural network may output the transfer function of the optimal secondary path filter based on the inputting of the second data Z(n). Accordingly, the controller 120 may determine the transfer function of the optimal secondary path filter by using the artificial neural network.

More specifically, the controller 120 may input the second data Z(n) to the learned artificial neural network, and select the secondary path model based on output data of the learned artificial neural network.

According to the present disclosure, the difference between the actual secondary path and the estimated secondary path may be determined from various data received through a vehicle communication network, and the optimal secondary path model may be selected.

Accordingly, according to the present disclosure, by selecting and applying the optimal secondary path model in advance before actual control of the noise canceling function is performed, it is possible to respond without noise boosting even if the secondary path is changed.

Furthermore, according to the present disclosure, by preventing algorithm divergence occurring according to the error of the secondary path model, it is possible to prevent excessive output of the speaker and maintain stable control.

Furthermore, according to the present disclosure, by efficiently responding to a change in the secondary path, it is possible to provide the optimal noise canceling function to the occupants.

As is apparent from the above, according to various embodiments of the present disclosure, it is possible to quickly select then optimal secondary path model even if the secondary path is changed.

In addition, according to various embodiments of the present disclosure, it is possible to respond to the change in the secondary path without noise boosting by selecting the optimal secondary path model before the anti-noise sound is output.

In addition, according to various embodiments of the present disclosure, it is possible to prevent the error that may occur due to the error of the secondary path model, thereby preventing excessive output of the speaker and providing stable anti-noise sound.

On the other hand, the above-described embodiments may be implemented in the form of a recording medium storing instructions executable by a computer. The instructions may be stored in the form of program code. When the instructions are executed by a processor, a program module is generated by the instructions so that the operations of the disclosed embodiments may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although embodiments of the disclosure have been shown and described, it would be appreciated by those having ordinary skill in the art that changes may be made in these embodiments without departing from the principles and spirit of the disclosure, the scope of which is defined in the claims and their equivalents.

What is claimed is:

1. A noise cancelling system for a vehicle, comprising:
a microphone;
at least one first sensor configured to collect first data associated with at least one first element that generates a noise sound;
at least one second sensor configured to collect second data associated with at least one second element that changes a secondary path of the noise sound, wherein the second data includes at least temperature data, humidity data, and occupant information related to a driving environment of the vehicle;
a controller configured to:
select a secondary path model corresponding to the second data from among a plurality of pre-stored secondary path models;
input the first data to a secondary path filter corresponding to the selected secondary path model; and
generate an anti-noise signal based on output data of the secondary path filter and error data received from the microphone; and
a speaker configured to output an anti-noise sound based on the anti-noise signal.

2. The noise cancelling system of claim 1, wherein:
the at least one first sensor includes at least one of: a vibration sensor and an engine revolutions per minute (RPM) sensor, and
the at least one second sensor includes at least one of: a temperature sensor, a humidity sensor, and a seat sensor.

3. The noise cancelling system of claim 2, wherein the controller is further configured to:
select the secondary path model corresponding to the second data based on at least one of: temperature, humidity, number of occupants, and position of each occupant.

4. The noise cancelling system of claim 2, wherein the plurality of secondary path models are pre-defined based on at least one of: temperature, humidity, number of occupants, and position of each occupant.

5. The noise cancelling system of claim 1, wherein the controller is further configured to:
generate the anti-noise signal by inputting the first data into an anti-noise signal generation filter.

6. The noise cancelling system of claim 5, wherein the controller is further configured to:
correct a transfer function of the anti-noise signal generation filter based on the output data of the secondary path filter and the error data received from the microphone.

7. The noise cancelling system of claim 1, wherein the controller is further configured to:
store a lookup table in which the second data and the plurality of secondary path models are matched.

8. The noise cancelling system of claim 7, further comprising a communicator configured to:
receive update data for updating the lookup table from a server.

9. The noise cancelling system of claim 1, further comprising a user interface configured to receive a user input for stopping or activating the output of the anti-noise sound.

10. The noise cancelling system of claim 1, further comprising the vehicle.

11. A method of controlling a noise cancelling system of a vehicle, the method comprising:
receiving, by a controller, first data associated with at least one first element that generates a noise sound;
receiving, by the controller, second data associated with at least one second element that changes a secondary path of the noise sound, wherein the second data includes at least temperature data, humidity data, and occupant information related to a driving environment of the vehicle;
selecting, by the controller, a secondary path model corresponding to the second data from among a plurality of pre-stored secondary path models;
inputting, by the controller, the first data to a secondary path filter corresponding to the selected secondary path model;
generating, by the controller, an anti-noise signal based on output data of the secondary path filter and error data received from the microphone; and
outputting, by the controller, an anti-noise sound based on the anti-noise signal.

12. The method of claim 11, wherein
the first data is obtained by at least one of: a vibration sensor and an engine revolutions per minute (RPM) sensor, and
the second data is obtained by at least one of: a temperature sensor, a humidity sensor, and a seat sensor.

13. The method of claim 12, wherein selecting the secondary path model further comprises:
selecting, by the controller, the secondary path model corresponding to the second data based on at least one of: temperature, humidity, number of occupants, and position of each occupant.

14. The method of claim 12, wherein the plurality of secondary path models are pre-defined based on at least one of: temperature, humidity, number of occupants, and position of each occupant.

15. The method of claim 11, wherein generating the anti-noise signal further comprises:
generating, by the controller, the anti-noise signal by inputting the first data into an anti-noise signal generation filter.

16. The method of claim 15, wherein generating the anti-noise signal further comprises:
correcting, by the controller, a transfer function of the anti-noise signal generation filter based on the output data of the secondary path filter and the error data collected from the microphone.

17. The method of claim 11, wherein the pre-stored plurality of secondary path models is included in a lookup table in which the second data and the plurality of secondary path models are matched.

18. The method of claim 17, further comprising receiving, by the controller, update data for updating the lookup table from a server.

19. The method of claim 11, further comprising receiving, by the controller, a user input for stopping or activating the output of the anti-noise sound.

* * * * *